US007785183B1

(12) United States Patent
Stockham et al.

(10) Patent No.: US 7,785,183 B1
(45) Date of Patent: Aug. 31, 2010

(54) CASINO GAME AND METHOD OF PLAY

(76) Inventors: Robert L. Stockham, 412 MacArthur Way, Las Vegas, NV (US) 89107; Peter J. Romleski, 2723 Port Lewis Ave., Henderson, NV (US) 89052

( * ) Notice: Subject to any disclaimer, the term of this patent is extended or adjusted under 35 U.S.C. 154(b) by 502 days.

(21) Appl. No.: 10/843,797

(22) Filed: May 11, 2004

(51) Int. Cl.
*A63F 1/00* (2006.01)
*A63F 13/00* (2006.01)

(52) U.S. Cl. .............................. 463/13; 463/26; 463/27; 463/42; 273/292

(58) Field of Classification Search ................... 463/13, 463/18, 42, 26, 27; 273/274, 292, 303
See application file for complete search history.

(56) References Cited

U.S. PATENT DOCUMENTS

| | | | | |
|---|---|---|---|---|
| 4,861,041 | A | 8/1989 | Jones et al. | |
| 5,042,818 | A * | 8/1991 | Weingardt | 463/13 |
| 5,257,784 | A * | 11/1993 | Boylan et al. | 463/18 |
| 5,332,219 | A * | 7/1994 | Marnell et al. | 463/13 |
| 5,772,506 | A * | 6/1998 | Marks et al. | 463/13 |
| 5,882,259 | A * | 3/1999 | Holmes et al. | 463/13 |
| 6,251,013 | B1 * | 6/2001 | Bennett | 463/13 |
| 6,345,823 | B1 | 2/2002 | Webb | |
| 6,386,973 | B1 * | 5/2002 | Yoseloff | 463/13 |
| 6,461,240 | B1 * | 10/2002 | Perkins | 463/13 |
| 6,604,998 | B1 * | 8/2003 | Singer et al. | 463/13 |
| 2003/0062681 | A1 | 4/2003 | Gauselmann | |
| 2003/0181232 | A1 * | 9/2003 | Peccole, Jr. | 463/13 |
| 2003/0222402 | A1 | 12/2003 | Olive | |
| 2004/0009808 | A1 | 1/2004 | Gauselmann | |

* cited by examiner

*Primary Examiner*—Dmitry Suhol
*Assistant Examiner*—Damon J. Pierce
(74) *Attorney, Agent, or Firm*—Greenberg Traurig

(57) ABSTRACT

A video poker game facilitating a jackpot bonus is disclosed. The jackpot bonus may be based on a single video poker machine, a bank of machines or a wide area network of machines. The jackpot is implemented by establishing one or more jackpot hands (e.g., royal flush). Then, prior to, or in between, the play of each conventional video poker game, five or more cards are randomly designated as unique cards. The jackpot is awarded to a player obtaining the pre-established jackpot hand containing five unique cards. Therefore, the game comprises a first level of randomness associated with the shuffling of the cards and second associated with the random designation of cards within the deck. Optionally, an award may be paid for final hands containing less than five unique cards. For example, a royal flush comprising four unique cards may generate an enhanced award.

18 Claims, 4 Drawing Sheets

| | 1 | 2 | 3 | 4 | 5 |
|---|---|---|---|---|---|
| ROYAL FLUSH | 800 | 1600 | 2400 | 3200 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIRS | 2 | 4 | 6 | 8 | 10 |
| JACKS OR BETTER | 1 | 2 | 3 | 4 | 5 |

CASINO GAME AND METHOD OF PLAY

FIELD OF THE INVENTION

The embodiments of the present invention relate to casino wagering game. More particularly, the embodiments relate to a video poker game and method of play.

BACKGROUND

The expansion of the gaming industry has created a great demand for new games of chance. Accordingly, as more and more casinos continue to be built competition for retaining current patrons and attracting new patrons increases. One method to retain and attract patrons is to provide patrons with new electronic gaming devices or machines offering players the possibility of winning large progressive type jackpots. Two of the most popular slot machines in the casino industry are Megabucks® and Wheel of Fortune®. The games are popular in large part due to the attractive progressive jackpots associate therewith. For example, the Megabucks® jackpot is funded at $8,000,000 and grows until won. The jackpot has exceeded $32,000,000. The jackpots associated with the Wheel of Fortune® games are more modest (e.g., $750,000 to $4,000,000) but still entice large numbers of players.

Both Megabucks® and Wheel of Fortune® generate large jackpots by linking a plurality of slot machines over multiple gaming properties such that dedicated portions of each wager or each wager are applied to the ever-growing jackpot amount. For example, there are over 700 Megabucks® machines linked throughout the state of Nevada. Another popular game facilitated by a gaming device is video poker. While video poker has an attractive pay table, including an 800 to 1 (or more) payout for hitting a Royal Flush, video poker does not facilitate a progressive jackpot funded over multiple properties. Video poker machines are linked in a local area, usually a bank of machines, to generate slightly larger progressive payouts. However, the jackpots are significantly smaller in comparison to those disclosed above.

Therefore, there continues to be a need for a method of generating a progressive jackpot related to the underlying game of video poker.

SUMMARY

Accordingly, a first embodiment of the present invention comprises linking a plurality of video poker machines over multiple gaming properties. A progressive jackpot is then initially funded in a conventional manner and progressively increased by dedicating a portion of each wager to increasing the jackpot until won. Once the progressive jackpot is won the jackpot is funded to a specific pre-established amount (e.g., $1,000,000). In general, conventional video poker is facilitated by an electronic gaming device incorporating a processor, random number generator, display screen and one or more player interfaces. After a player wager, the game begins with the device or machine displaying the player five initial cards from a simulated deck of cards. The player then holds or discards each of the five cards. Discards are replaced with new cards from the simulated deck of cards. The player wager is then resolved based on the strength of the five-card poker hand subsequent to the draw sequence. With the first embodiment of the present invention, five or more cards in the deck are randomly designated, for example, gold cards. A progressive jackpot is then based on a player obtaining a pre-established poker hand (e.g., Royal Flush) wherein each of the cards is a designated gold card. In other words, there are two layers of randomness. One random layer is associated with the conventional video poker manner of ordering the cards in the deck prior to deal and the second layer of randomness is the designation of certain cards within the deck.

In one embodiment, the cards are randomly arranged and then five or more of the cards are randomly designated as gold cards. Alternatively, the cards may be designated first and then randomly arranged or the cards may be randomly arranged and designated generally simultaneously. In one example, the Royal Flush comprising the 10♠, J♠, Q♠, K♠ and A♠ is designated as the jackpot hand. Multiple hands may be designated as jackpot hands as well. Should the player's final hand comprise the five designated cards and the cards have each been designated gold cards, the player may win the primary game for the royal flush and either wins the progressive jackpot or is eligible for the progressive jackpot based on the five gold cards. Eligibility may be dependent upon the amount of a primary game wager. That is, to win the progressive jackpot the player may be required to place a maximum machine wager. Also, the player may only be awarded the jackpot rather than the jackpot and the primary game award.

It is also conceivable that one, two, three or four gold cards in a final pre-established winning hand (i.e., after the deal and replacement cards have been dealt) may facilitate an enhanced award. For example, with the previous hand, if the A♠ in the final hand was not a designated gold card, the player may still win the primary hand award for the conventional royal flush and may optionally win an enhanced award based on the four gold cards in the designated jackpot hand.

The number and rank of cards designated as gold cards can be altered to provide acceptable odds and to identify different poker hands as jackpot winners. Also, poker hands other than the jackpot hand which include gold cards may correspond to awards related to a small percentage of the progressive jackpot.

Other embodiments, modifications and variations are evident from the corresponding drawings, detailed description and claims as set forth herein.

DETAILED DESCRIPTION

The operation of electronic gaming devices or machines, including video poker machines, is well known in the industry so that the minute details are not set forth herein. In general terms, video poker machines are controlled by processors including, or in communication with, a random number generator. The random number generator generates the machine's outcomes. A display in communication with the processor provides visual information to players.

It is also well-known that multiple gaming devices may be linked via a central computer or server to create a wide area gaming network. The central computer then tracks relevant data and facilitates large jackpots and related benefits to linked devices.

Figure 1:
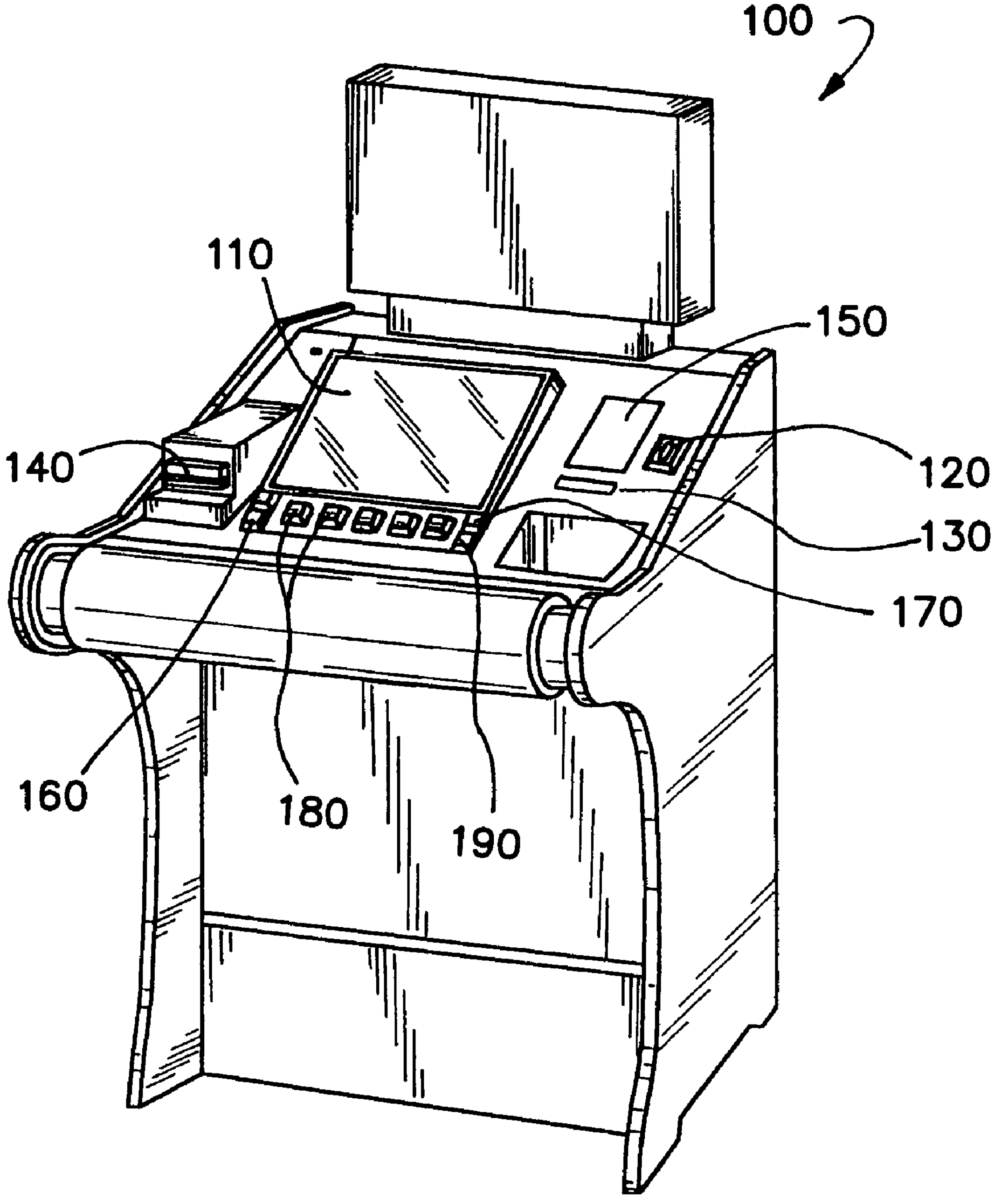
FIG. 1 shows an electronic gaming of the type used to facilitate a video embodiment of the present invention.

Reference is now made to the figures wherein like parts are referred to by like numerals throughout. FIG. 1 illustrates a perspective view of a video poker type gaming machine for facilitating the embodiments of the present invention and is generally denoted by reference numeral 100. The general external features of the video poker machine 100 include a display screen 110, coin slot 120, a bill reader 130, a card reader 140 and a credit display 150. The gaming machine 100 also includes several player buttons which act as interfaces between the player and the machine processor. Player buttons include a one coin wager button 160, maximum coin wager button 170, hold and discard buttons 180 and a play or deal button 190. While not shown, the machine 100 may also incorporate a ticket dispenser for printing tickets for redemption at a cashier window. Such cashless systems are becoming increasingly popular in most gaming jurisdictions. It is noted that any of the functions facilitated by the gaming machine buttons 160-180 can be accomplished using a display employing touchscreen technology.

Figures 2, 6:
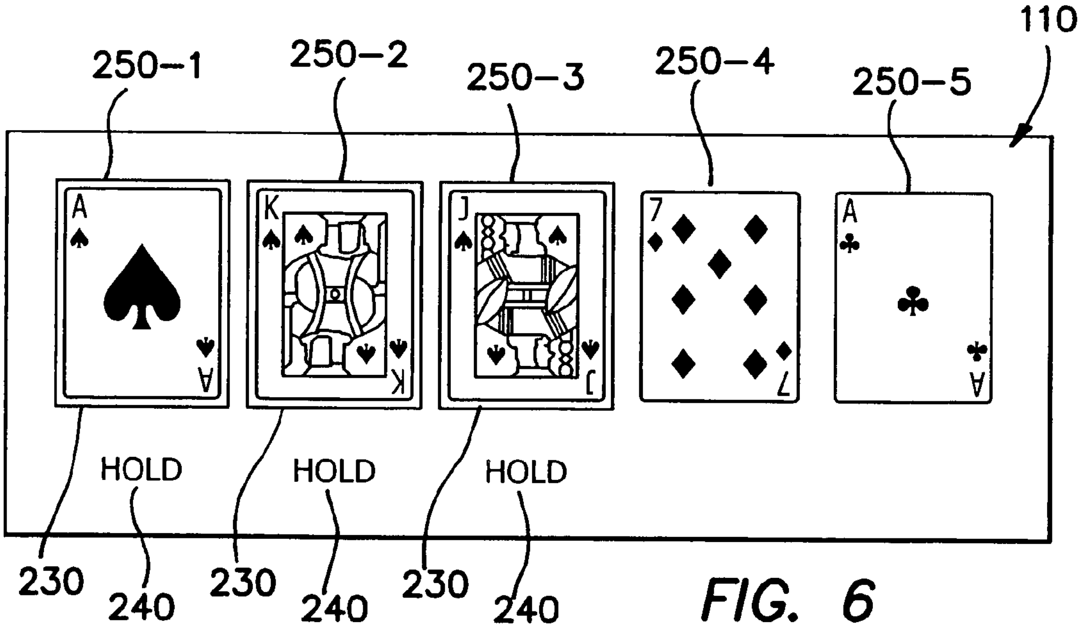
FIG. 2 shows a conventional video poker pay table.
FIG. 6 shows a display screen displaying five initial cards wherein the player may be inclined to chase a progressive jackpot rather than a winning primary game hand.

FIG. 2 shows a pay table 190 associated with conventional video poker. It is noted that other pay tables exist for conventional video poker and its many variations. Moreover, local video poker machines have been linked to provide enhanced payouts for certain poker hands such as the Royal Flush and four of a kind. The linked machines are played in exactly the same fashion as conventional video poker. Consequently, none of the systems of linked local video poker machines utilize the multiple layers of randomness employed by the embodiments of the present invention.

In a first embodiment of the present invention, a pre-established winning poker hand is assigned as the progressive jackpot hand. For example, the hand may be the Royal Flush of spades. Alternatively, four Aces and a two kicker may be assigned as the progressive jackpot hand. Then, during each play of the game, five or more cards from the standard deck of cards are randomly designated as gold cards. The designation may also take other forms including silver cards, blinking cards, highlighted cards or card borders and any means for notifying players that the cards are designated cards which may or may not relate to the progressive jackpot. Thus, if the player obtains the pre-established winning poker hand comprising all designated gold cards, the player wins, or is eligible for, the progressive jackpot. Consequently, in order to win the progressive jackpot two things need to happen. First, the cards forming the pre-established jackpot hand must be designated as gold cards; and second, the player's final hand must comprise the pre-established jackpot hand containing the designated gold cards.

To adjust the odds associated with the embodiments of the present invention, more than five cards may be randomly designated as gold cards and/or the number of progressive jackpot hands may be increased. For example, by randomly designating ten gold cards instead of five, the likelihood that the cards forming the pre-established jackpot hand will be designated and become part of a player's final hand. Similarly, by increasing the number of jackpot hands it becomes more likely that the designated cards will include the cards of one of the pre-established jackpot hands.

The cards are randomly designated by the random number generator either before, during or after the random card arrangement is completed. Conventionally, the cards are randomly redistributed or shuffled through many cycles during machine idle time. Accordingly, the cards may be rearranged or shuffled hundreds of times between plays of each game. The shuffling of the cards ends once a player wager is received by the machine or another triggering event takes place. With the embodiments of the present invention, the random number generator may randomly designate the gold cards during each shuffle cycle of the cards or may designate the gold cards during a first shuffle cycle such that the identity of the gold cards is only designated a single time between plays of each game rather than multiple times.

Figure 3:
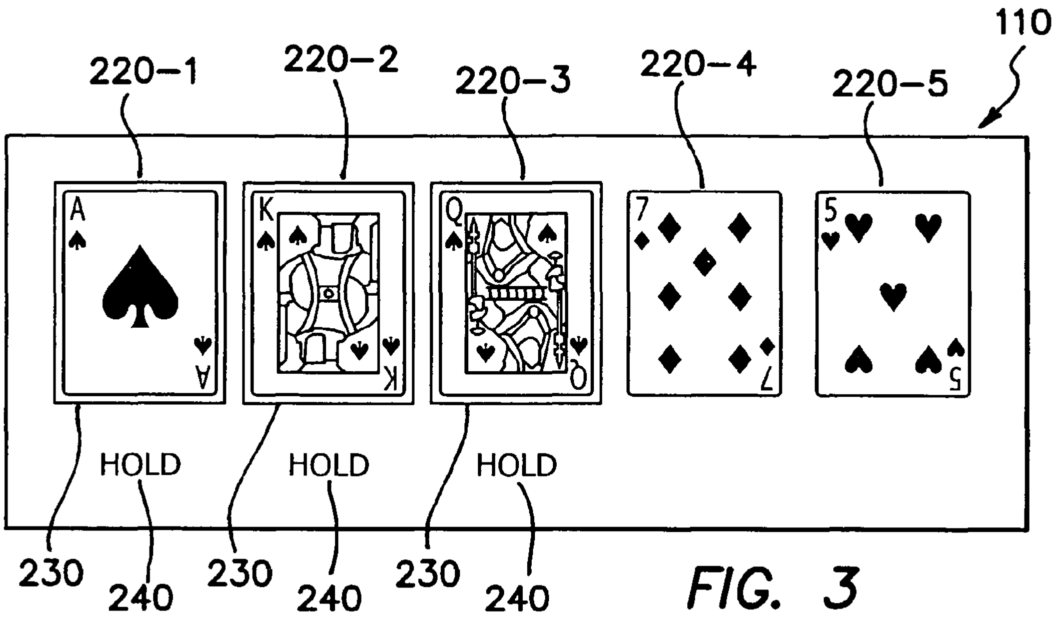
FIG. 3 shows a display screen displaying five initial cards, including three gold cards.
Figure 4:
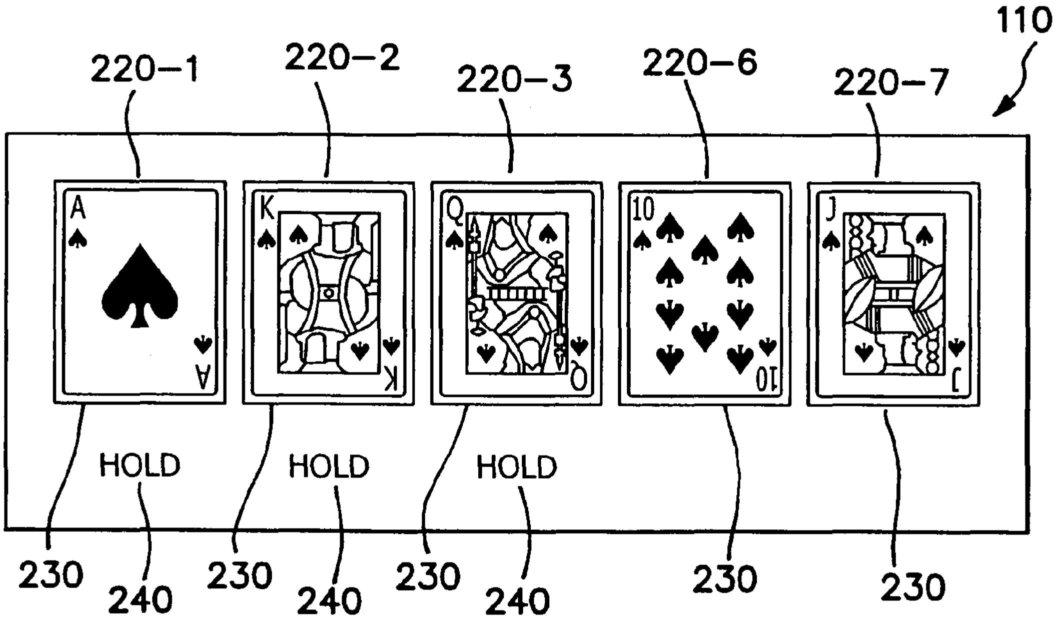
FIG. 4 shows the display screen once replacement cards have been dealt such that five gold cards have been dealt.

Now referring to FIG. 3, the display screen 110 displays an initial five-card poker hand comprising the A♠ 220-1 (gold), K♠ 220-2 (gold), Q♠ 220-3 (gold), 7♦ 220-4 and 5♥ 220-5. For purposes of this embodiment, the jackpot winning hand is the royal flush of spades. In the example hand shown, three gold cards comprising the A♠ 220-1, K♠ 220-2 and Q♠ 220-3 have been dealt. The gold border 230 of each card 220-1 through 220-3 immediately notifies the player that the highlighted cards form a fraction (i.e., three) of the five cards necessary to win the progressive jackpot. The player now must decide which cards to hold and discard. In the instant case, the player has elected to hold, as indicated by the HOLD icon 240, the three gold cards 220-1 through 220-3. At this point, the player only has a chance to win the progressive jackpot if the 10♠ and J♠ have been designated as gold cards which is unknown to the player. FIG. 4 shows the display screen once the discards 220-4 and 220-5 have been replaced. The replacement cards are the 10♠ 220-6 (gold) and J♠ 220-7 (gold). The two gold replacement cards 220-6 and 220-7 complete the progressive jackpot hand.

Figure 5:
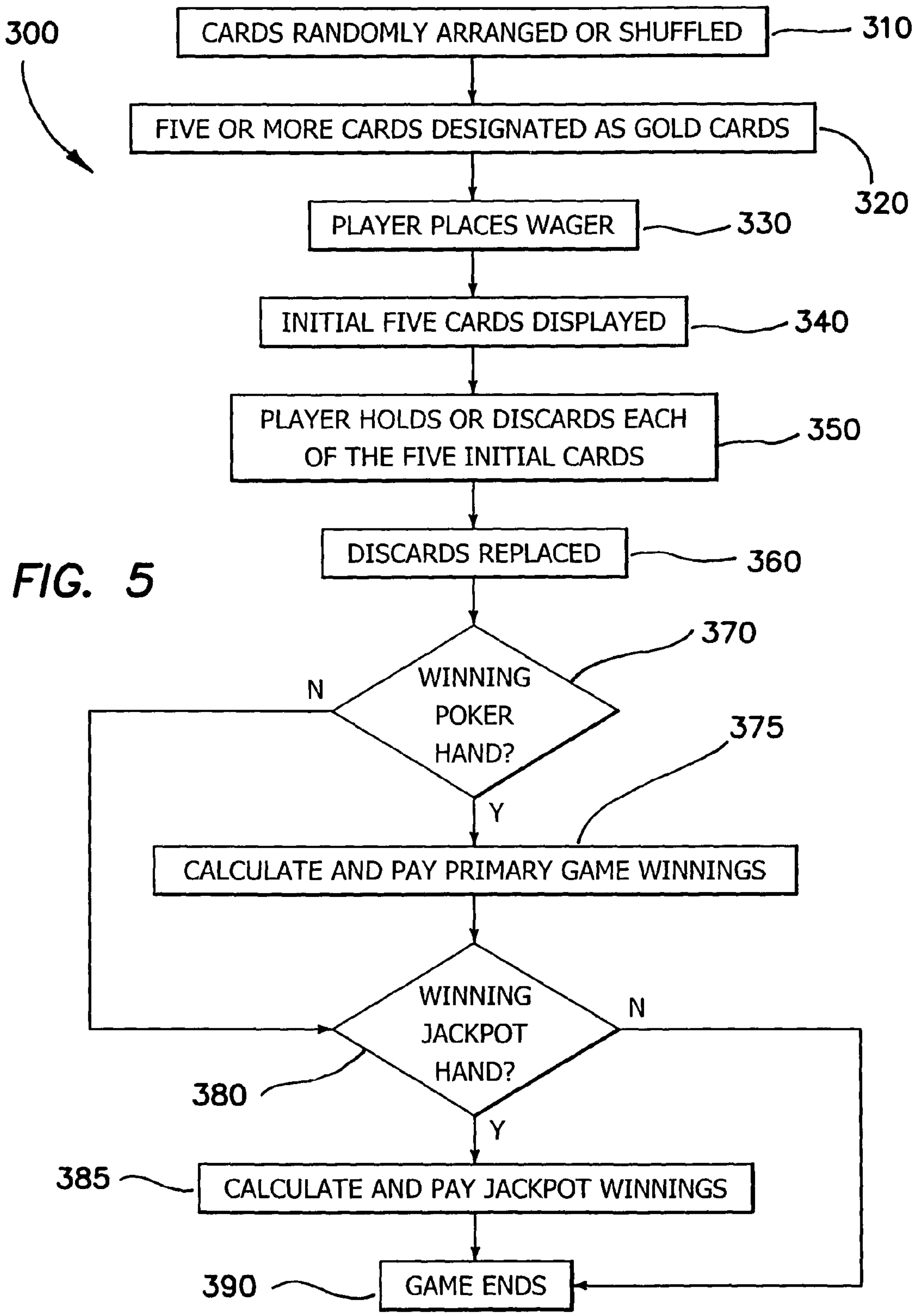
FIG. 5 shows a flow chart detailing one embodiment of the present invention.

FIG. 5 shows a flow chart 300 outlining generally the details of the present invention facilitated by an electronic gaming machine or device. It is understood that prior to play of the device one or more poker hands have been selected as possible jackpot hands (e.g., royal flush of spades). At step 310, the gaming device, namely the random number generator, randomly arranges the simulated cards from a standard deck of fifty-two cards. At step 320, the gaming device, namely the random number generator, randomly designates five or more cards from the deck of cards as gold cards. Steps 310 and 320 can be accomplished in the opposite order or may take place simultaneously. At step 330, a player places a wager. At step 340, the first five cards off the simulated deck are displayed. Then, the player, at step 350, elects to hold or discard each of the five cards. Discards are replaced at step 360. At step 370, the device determines whether the final five cards form a winning poker hand according to a standard video poker table and provides the corresponding payout at step 375. At step 380, the device determines whether the final five cards, including any designated gold cards, form a winning jackpot hand and provides the corresponding payout at step 385. The game ends at step 390 and loops back to step 310 for the next game.

While the large progressive jackpot of the present invention directly increases play and casino revenue, the embodiments also provide an indirect increase in casino revenue. The indirect benefit is based on players passing on a winning hand to chase the large progressive jackpot. For example, now referring to FIG. 6, the display screen 110 displays an initial five-card poker hand comprising the A♠ 250-1 (gold), K♠ 250-2 (gold), J♠ 250-3 (gold), 7♦ 250-4 and A♣ 250-5. Based on pay table 190, the pair of Aces 250-1 and 250-5 comprises a winning hand even before the draw. However, the player may opt to hold the A♠ 250-1 (gold), K♠ 250-2 (gold) and J♠ 250-3 (gold) in an effort to chase the progressive jackpot thereby passing on a sure fire winning hand.

To further enhance the level of required player skill, in another embodiment of the present invention, players are only eligible for a jackpot award if they hold all designated gold cards after the initial deal. For example, assume a player is dealt the A♠ (gold), A♣, K♠ (gold), Q♠ (gold) and 7♥ (not shown). The player must decide between holding the pair of Aces, which already comprise a winning hand pursuant to the conventional pay table of FIG. 2, or the three gold cards. However, with this embodiment, the player can only win an award, of any kind, should he or she receive the 10♠(gold) and J♠(gold). Consequently, if the player receives the 10♣ and J♦ forming a straight, the player does not win the conventional award for the straight as set forth in the pay table of FIG. 2. Such an embodiment requires the player to thoroughly evaluate the options prior to selecting his or her hold cards and discards.

In one embodiment of the present invention, to be eligible for the progressive jackpot, the player must play the maximum wager offered by the machine (e.g., five units or coins). Thus, the player would have to wager $1.25 on a quarter machine or wager $5.00 on a dollar machine. Alternatively, less than maximum coins may render the player eligible for the jackpot.

Jackpots of the present invention may be facilitated by a single machine, a plurality of local linked machines or a plurality of wide area linked machines. To generate the largest jackpots and to entice players, the wide area progressive jackpot is ideal. In other words, linking a plurality of machines over multiple gaming properties generates a large progressive jackpot and creates player excitement.

Any video poker variation, including, but not limited to, jacks or better, joker poker, double bonus poker, double-double bonus poker, multi-hand poker and deuces wild, may be enhanced by the embodiments of the present invention.

Although the invention has been described in detail with reference to several embodiments, additional variations and modifications exist within the scope and spirit of the invention as described and defined in the following claims.

We claim:

1. A method of conducting an electronically implemented poker-based wagering game on a gaming device having at least a processor, display, memory and user interface, comprising:

processor-implemented steps of:

assigning one or more poker hands as progressive jackpot poker hands;

accepting a player wager;

prior to displaying any cards to the player, utilizing a randomizing program to randomly and inconspicuously designate at least five cards from a plurality of cards;

displaying to a player one or more initial random cards from the plurality of cards wherein said designated unique cards are displayed visually distinguishable from non-designated cards wherein said designated cards are made visually distinguishable from said non-designated cards using a colored border, different colored cards, blinking cards and/or highlighted cards;

allowing the player to hold or discard each of the initial cards;

displaying random replacement cards for each discard from cards remaining in the plurality of cards; and providing a progressive jackpot if said final poker hand comprises an assigned progressive jackpot poker hand formed of five designated cards, said progressive jackpot only winnable if said randomly designated cards are capable of forming the one or more assigned progressive jackpot poker hands.

2. The method of claim 1 further comprising providing an enhanced award for a final poker hand comprising an assigned jackpot hand wherein said jackpot hand contains one or more of said designated cards wherein said one or more said designated cards are necessary to form the assigned jackpot hand.

3. The method of claim 1 further comprising basing the progressive jackpot award on a poker hand formed of five designated cards.

4. The method of claim 1 further comprising assigning the progressive jackpot as a royal flush.

5. The method of claim 1 further comprising utilizing an electronic gaming device selected from a group consisting of stand alone machines and networked machines.

6. The method of claim 1 further comprising distinctively coloring the designated cards relative to said non-designated cards.

7. A method of conducting an electronically implemented poker-based wagering game on a gaming device having at least a processor, display, memory and user interface comprising:

processor-implemented steps of:

pre-establishing one or more progressive jackpot poker hands;

accepting a player wager;

prior to displaying any cards to the player, utilizing a randomizing program to randomly and inconspicuously designate five or more cards from a deck of cards;

displaying to a player five initial random cards from the plurality of cards, wherein said designated cards are visually distinguishable from non-designated cards wherein said designated cards are made visually distinguishable from said non-designated cards using a colored border, different colored cards, blinking cards and/or highlighted cards;

allowing the player to hold or discard each of the initial cards;

displaying random replacement cards for each discard from cards remaining in the plurality of cards; and providing a progressive jackpot if said final poker hand comprises an assigned progressive jackpot poker hand formed of five designated cards, said progressive jackpot only winnable if said randomly designated cards are capable of forming the one or more assigned progressive jackpot poker hands.

8. The method of claim 7 further comprising providing an enhanced award for a final poker hand comprising an assigned jackpot hand wherein said jackpot hand contains one or more of said designated cards wherein said one or more said designated cards are necessary to form the assigned jackpot hand.

9. The method of claim 7 further comprising basing the progressive jackpot award on a poker hand formed of five designated cards.

10. The method of claim 7 further comprising assigning the progressive jackpot as a royal flush.

11. The method of claim 7 further comprising utilizing an electronic gaming device selected from a group consisting of stand alone machines and networked machines.

12. The method of claim 7 further comprising distinctively coloring the cards relative to said designated cards.

13. A method of playing a wagering game facilitated by one or more linked electronic gaming devices, each having a processor, random number generator, one or more player interfaces and display screen, and each linked to a common central computer, comprising:

processor-implemented steps of:

pre-establishing one or more progressive jackpot poker hands;

prior to displaying any cards to the player, utilizing said random number generator to randomly and inconspicuously designate one or more cards from a plurality of cards;

displaying on the display screen five initial cards from the plurality of cards, wherein any of said designated cards are displayed visually distinguishable from non-designated cards wherein said designated cards are made visually distinguishable from said non-designated cards using a colored border, different colored cards, blinking cards and/or highlighted cards;

providing a player an option to either hold or discard each initial card by means of the one or more player interfaces;

replacing each of the discards from cards, including designated cards, remaining in the plurality of cards; and providing a progressive jackpot if said final poker hand comprises an assigned progressive jackpot poker hand formed of five designated cards, said progressive jackpot only winnable if said randomly designated cards are capable of forming the one or more assigned progressive jackpot poker hands.

14. The method of claim 13 further comprising providing an enhanced award for a final poker hand comprising an assigned jackpot hand wherein said jackpot hand contains one or more of said designated cards wherein said one or more said designated cards are necessary to form the assigned jackpot hand.

15. The method of claim 13 further comprising basing the progressive jackpot award on a poker hand formed of five designated cards.

16. The method of claim 13 further comprising assigning the progressive jackpot as a royal flush.

17. The method of claim 13 further comprising utilizing an electronic gaming device selected from a group consisting of stand alone machines and networked machines.

18. The method of claim 13 further comprising distinctively coloring the designated cards relative to said non-designated cards.

* * * * *